Sept. 12, 1967   L. C. ELY   3,340,682
YIELDABLE MOWER BLADE
Filed June 16, 1966
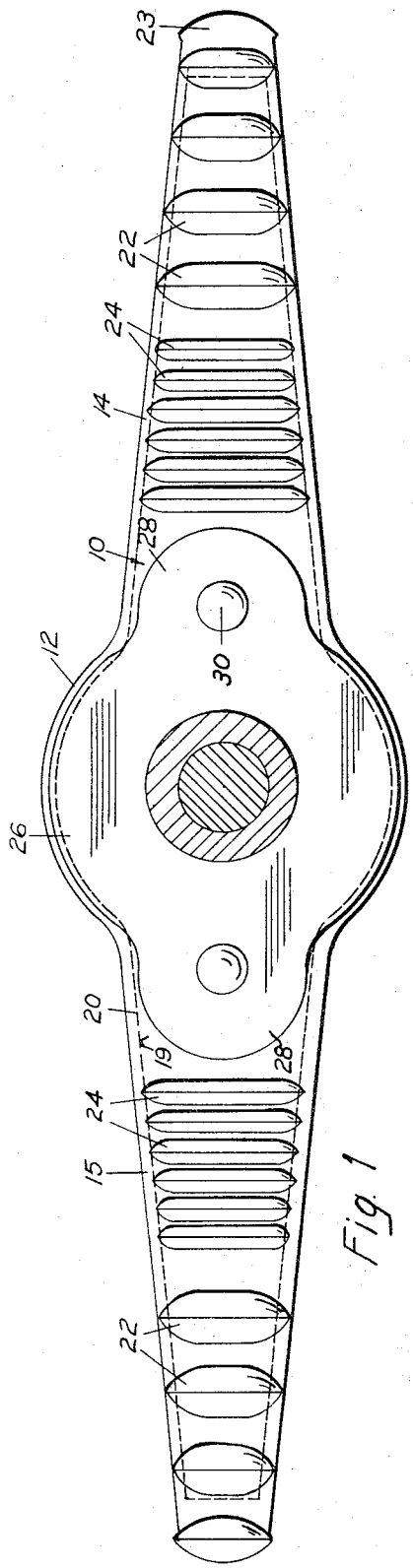
Fig. 1
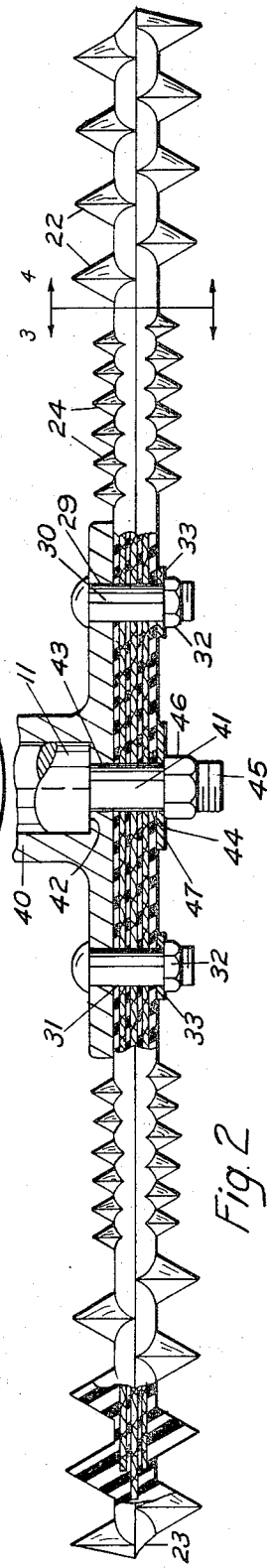
Fig. 2
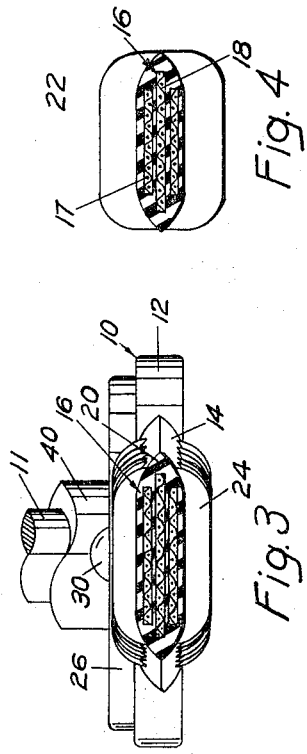
Fig. 4
Fig. 3
INVENTOR
LEWIS C. ELY
Newton, Hopkins,
Jones & Ormsby
ATTORNEYS

United States Patent Office 3,340,682
Patented Sept. 12, 1967

3,340,682
YIELDABLE MOWER BLADE
Lewis C. Ely, Atlanta, Ga., assignor, by mesne assignments, to Dayco Corporation, Dayton, Ohio, a corporation of Delaware
Filed June 16, 1966, Ser. No. 558,040
6 Claims. (Cl. 56—295)

ABSTRACT OF THE DISCLOSURE

A flexible elastomeric lawn mower blade for mounting on a rotary mower, comprising cutting arms extending outwardly from the central mounting portion. A plurality of auxiliary cutters project from the upper and lower surfaces of the arms, and the blade has a nonelastic reinforcing member embedded therein.

---

This invention pertains to a yieldable mower blade, and is an improvement over my copending application Serial No. 330,665, filed Dec. 16, 1963, now United States Patent No. 3,302,377. The blade is adapted to be mounted on a rotary mower of the type in which a mower blade is mounted for rotation on a vertical axis with the blade rotating in a plane parallel to and vertically spaced from the ground surface over which the mower travels. Such mowers, as set forth in my prior application above referred to, are common domestic equipment and are conventionally provided with electrical or internal combustion engine power driving means. The specific structure of the mower, its body, propulsion mechanism or driving equipment, forms no part of the present invention. The highly developed state of the art with respect to such rotary blade mowers provides ample illustration of many varied devices within this category with respect to which the blade of the present invention may be utilized. The more general objects, features and advantages of the present blade are set forth in said prior application and are here incorporated by reference.

The blade of the present invention may be broadly defined, with that of the blade of my prior application, as comprising an elongate elastomeric body relatively flexible transversely of its longitudinal axis and about such axis but restricted as to flexible elongation of its axis by the incorporation within the blade of relatively non-elastic means inhibiting excess elongation under centrifugal forces such as incident to the rotation of the blade.

However, as distinct from the blade construction of the parent application, although of a similar outwardly tapering blade arm configuration extending from a central circular hub, the present blade arms are characterized by the provision of auxiliary cutters angularly projecting from the plane of the blade arms. In the present form of the invention, the auxiliary cutters are presented as vertically projecting cutters extending preferably from both the upper and lower surfaces of the otherwise flat horizontal blade arms. The vertically extending cutters are effective to cut grass or other material disposed below the cutting plane of the horizontal edge of the blade, and particularly grass or plants disposed in a horizontal plane below the blade. This is a desirable effect when the blade is utilized to mow crab grass, centipede grass or other plants that usually spread in a horizontal direction, or that have been bent over due to the action of the mower, or other causes.

The auxiliary or vertical cutters are, in that form of invention herein disclosed, preferably of substantially triangular transverse cross section. Such section provides for the merging of the base of the triangular section with the upper surface of the blade arm while the apex of the elongate triangle, thus formed, presents a transverse cutting edge spaced from the longitudinal cutting edge of the blade arm. The terminal ends of the transverse cutters are tapered downwardly, without loss of their generally triangular cross section, towards the body of the blade arm and terminate either a short distance inwardly from the side edges of the blade arm or merge with the longitudinal cutting edges of such sides. As will be noted, the transverse triangular cutters are preferably arranged as alternate upward and downward projections from the blade arm to achieve a uniform blade balance and strength throughout the length of the dimenishing blade arm cross section.

It will also be noted that the present blade has a dual life of effective and efficient cutting action. In the rotation of the blade the cutting action of any longitudinal blade arm will be at the leading edge of such blade arm which is moving forward in the direction of travel of the mower. In the revolution of the blade such edge will be followed by the opposite edges of the other blade arm. The preponderant vertical cutting action of the projecting V-shaped cutters will be carried out by the downwardly projecting vertical cutters. Therefore, upon inversion of the blade body the formerly leading blade edges become the trailing edges, performing no cutting action and the formerly downwardly projecting vertical cutter will become the upwardly projecting cutters normally effecting a lesser cutting action.

The vertical cutters of the present invention, as herein set forth, are characterized by the provision of inner and outer sets of generally uniformly extending cutters of larger and smaller size. The larger cutters are disposed at the outer ends of the blade arms while the less extended cutters are inwardly disposed. By such an arrangement it will be seen that the weight of the larger cutters at the extremities of the blade arms provides a balancing of blade weight to at least compensate for the otherwise reduced weight of the outer end of the blade arm. In some instances, it has been found preferable to substantially over-compensate for the outwardly diminishing blade arm cross section so as to maintain an outwardly disposed center of gravity for the blade arm.

In the drawings, FIG. 1 is a top plan view of one embodiment of the present invention showing its mounting on the vertical drive shaft of a conventional mower;

FIG. 2 is a side elevation of the blade presented in FIG. 1 showing the central hub and one form of mounting thereof in section;

FIG. 3 is a sectional view taken on the section lines of FIG. 2 looking in the direction of the arrows 3—3;

FIG. 4 is a section taken on the same section lines looking in the direction of the arrows 4—4.

In the drawings, the body of the blade is generally indicated by the numeral 10. The body may be defined as including a central, preferably circular, hub 12 and diametrically opposed projecting integral blade arms 14 and 15, extending to the right and left, respectively, as shown in FIGS. 1 and 2.

The body 10 is preferably formed as an integral, predominantly solid elastomer. The body 10, includes means for inhibiting longitudinal stretch or elongation of the blades in response to centrifugal forces generated in the high speed revolution thereof. In the present instance, such means are shown in the form of one or more flights (here shown as 3) of fabric 16 which may be woven such as wire, asbestos, nylon, fiber or the like. In such case, the longer threads 17 preferably extend longitudinally of the body and the shorter threads 18 extending transversely thereof. The longitudinally extending threads, at least, are substantially linearly inelastic. The configuration of the fabric preferably conforms to the outline of the body 10 as indicated by the dotted lines 19. Such configuration, however, is shown as reduced to provide a marginal area 20 free from included fabric or other stretch resistant medium. The fabric 16 may be molded into the elastomer or otherwise bonded firmly thereto. Its presence lends strength and damage resistance generally to the body as well as precluding undue longitudinal extension under tension.

The choice of material of the elastomer of the body 10 is not specifically critical since a natural or artificial rubber or rubber-like compound may be employed. The material is, however, critical with respect to such factors as wear resistance, ability to maintain shape and form under varying climatic conditions and under forces engendered as a result of high speed revolution of the blade while suitably flexible for the purposes herein set forth. It will be noted, however, that substantially all elastomers which may be elected to serve this purpose will have a tendency towards longitudinal elongation under centrifugal force; hence, the inclusions of means for inhibiting such elongation.

The elastomer elected must also qualify with respect to such hardness as to withstand, with yieldable rigidity, prolonged contacts with the grass blades which are to be severed by rotation of the blade. In the compounding of such natural or synthetic rubbers or equivalents thereof, it is understood that the various compounds currently in common use for enhancing strength, durability and hardness of the material may be included. While such inclusions may provide such wear resistance as to facilitate the maintenance of a sharp cutting edge on the blade and act as an abrasive material at such edge, it is understood that such materials may be included without respect to their possible emergence at the blade edge as cutting elements.

A satisfactory performance of the cutting operation by the blade is not dependent upon such inclusions of materials primarily inserted for other purposes. The leading edge of the blade, acting as the primary cutting area, may become substantially dull or rounded without materially affecting the cutting action of the blade. In operation of the present invention, the cutting action is primarily due to the rapidity of motion of each blade edge. In its rotation the outer extremities of the blade will, of course, be rotating with a velocity considerably greater than that at the inner portions of the blade edge, the preponderance of the cutting action will be at such outer extremities of the blade edges. Hence, the weighing characteristics of the larger outer vertical cutters, in outwardly displacing the center of gravity of the blade arms, is significant.

The transverse projecting cutters, of generally triangular cross section extending across the upper and lower blade surfaces but terminating short of the edges thereof by a terminal incline merging with the edge of the blade body, are indicated in the drawings by the numerals 22 and 24. The merging portions preferably continue the triangular cross section. The cutters of the inner portion of the blade arms are provided with the lesser extending cutters 22 and the other cutters 24 are of greater extension and cross section. The cutters of each group are preferably of uniform height with lengths comparable with the width of the blade at the cutter location. As has been noted, the upper and lower cutters are preferably arranged in staggered relationship. Hence, the peak of the upper cutters are in vertical alignment with the valleys of the oppositely projecting lower cutters of the opposite face of the blade. A balance as to weight and a mean uniformity of blade thickness at each group of cutters is thus achieved. As hereinbefore noted, the enlarged character of the outer cutters 22 compensates, or overcompensates, for the outwardly diminishing weight of the blade. The terminal end of each blade is provided with a terminal projecting cutter 23. Such terminal cutters are preferably somewhat larger in transverse dimension so as to provide a rounded, bulbous blade end.

The blade body is here shown by way of example as mounted by a generally circular upper fixture plate 26 having oppositely disposed projecting ears 28 which are apertured at 29 to receive therethrough securing bolts 30, or equivalent securing means. The securing means 30 passes through longitudinally aligned vertically transverse apertures 31 of the blade body. The projecting ends of the bolts 30 receive securing nuts 32 and washers 33 which may engage the lower face of the hub 12 of the blade.

It is to be noted that the location of the spaced and axially aligned apertures 31 of the body 10, with respect to the longitudinal and transverse center lines of the body are of equal distance from the intersection of such center lines, on opposite sides thereof, and on the longitudinal axis. Further, such apertures are located substantially in the line of the projected curvature of the outer edge of the circular hub 12. This approximate location of the apertures 31 is of significant importance with respect to the flexibility of the blade arms 14 and 15 relative to the retained, and thus relatively rigid, central hub 12. It will, of course, be recognized that the formation of the apertures 31 involves a decrease of material both transversely of the body and longitudinally thereof at such apertures. Hence, a greater flexibility of the blades with respect to the central hub will tend to be localized at such apertures. Should the apertures be located inwardly of the projected circle of the hub, such localized flexibility will be substantially negated by the arm apertured mass of material extending outwardly along the axis of the blades from the apertures and by the clamping action of the blade body against the upper fixture plate 26. Similarly, if the apertures 31 are located outwardly along the axis of the blade arms beyond the projected periphery of the hub 12, the point of flexure would tend to be within the blade arm itself, rather than the juncture thereof with the hub. The blade arms might then become less flexible than desired and the weakening effect of the aperture may tend to encourage rupture of the blade material in the area of such apertures. It is therefore a feature of the present invention to locate any securing apertures of the blade, for the reception of any securing device, approximately in line with the curvature of the external edge of the hub.

It will be understood that the manner of fixing the blade for rotation with the drive shaft 11 of the power unit of a mower may be varied in accordance with the structure of the mower and such factors as the means for vertical adjustment of the blade with respect to such shaft. As an illustration of one mode of such attachment the plate 26, here illustrated, is provided with an upwardly extended cylindrical shaft receiving body 40 for accommodation therein the shaft 11, here shown as provided with a reduced downward shank 41, defining a shaft shoulder at 42. In this type of assembly, the shoulder 42 rests upon the upper face of the plate 26 within the body 40. A central aperture 43 of the plate 26 receives the shank 41 as does a central aperture 44 of the blade body. The lower end of the shank 41 is externally threaded as at 45 to receive an internally threaded securing nut 46 which bears against a bottom hub plate 47. It will, of course, be understood that the structure here depicted is merely illustrative of one of many conventional manners in which a blade may be secured to the rotary shaft 11. A wide variety of such securing means, dictated by the structure of the mower, may be resorted to.

In the operation of the present invention, it will, of course, be understood that the blade is rotated on a vertical axis extending centrally through the hub 12 with the blade arms 14 and 15 circling in a horizontal plane closely adjacent and parallel to the ground surface. The vertical spacing of the plane of motion of the blade arms may be variably adjusted by means of various designs usually employed in power mowers and well known in the art. The location of the plane of the blade arms is, of course, below the vertical height of the grass or other growth to be mowed. As the mower is moved over the surface, such growth is struck and severed by the leading edge of that blade arm which alternately presents a leading edge, as in the manner of my prior application. Concurrently with such severance in a horizontal plane, the auxiliary cutters sever the blades in an angularly related plane. Thus, though certain blades may not have achieved the height of the blade above the ground surface, or may have done so after a creeping or angular growth including a stem or blade portion below the plane of the blade, such lower blade or stem portion will be severed by contact with the auxiliary cutters as they move in their circular paths of travel extended angularly from the plane of the blade. It will further be noted that such cutting action by the auxiliary blades need not be confined to an action below the plane of the blade arm rotation. Long growths may extend above the plane of blade arm rotation to lie in an angular position above such plane. Whether or not such longer stems may evade severance by the blade edges, they may be engaged by the auxiliary cutters and thus be severed. Obviously, such secondary or angular severance may be repeated as to a single stem which may lie above or below the plane of the blade arms, but across the path of movement of the mower. Considerable enhanced mowing action may thus be achieved and as an incident thereto a superior mulching or comminuting of the blades may ensue.

It will be obvious to those skilled in the art that many variations may be made in the embodiments chosen for the purpose of illustrating the present invention without departing from the scope thereof as defined by the appended claims.

What is claimed as invention is:

1. A rotary mower blade having at least one arm, said blade comprised of an elastomer and a relatively non-elastic member, said nonelastic member being embedded in said elastomer and extending substantially throughout its length for resisting elongation of said blade when the same is subjected to centrifugal force, said blade having a plurality of integrally formed auxiliary cutters extending from the upper and lower surfaces of each arm and composed entirely of said elastomer.

2. The blade of claim 1 in which said auxiliary cutters have a triangular transverse cross section.

3. The blade of claim 1 in which said auxiliary cutters extend perpendicularly from the plane of rotation of said blade.

4. The rotary mower blade of claim 1 in which multiple auxiliary cutters are provided on each side of each blade arm and in which the auxiliary cutters of each arm constitute separate series of differing size.

5. The rotary mower blade of claim 4 in which the larger auxiliary cutters are outwardly disposed on each blade arm with respect to smaller auxiliary cutters.

6. A rotary mower blade of the type adapted to be rotated on a vertical axis for rotation in a substantially horizontal plane spaced from and generally parallel to the surface to be mown, including a body of substantially solid elastomer material having embedded therein a relatively inelastic fabric, said body defining a central hub defining means for attaching the blade to a driving shaft, and a plurality of blade arms radiating from said hub, said body including transverse apertures therethrough at the juncture of said blade arms with said hub, each of said blade arms including a plurality of sets of upper and lower integral transversely extending, perpendicular auxiliary cutters of triangular cross section, the auxiliary cutters of one surface of the blade arms being staggered with respect to the auxiliary cutters of the opposite side of said blade arms, the sets of said auxiliary cutters comprising an inner blade arm set of relative small size and an outer blade arm set of relatively larger size, the terminal auxiliary cutters of each arm being extended to form a rounded, bulbous end for its arm.

References Cited
UNITED STATES PATENTS

| | | | |
|---|---|---|---|
| 2,786,318 | 3/1957 | Caldwell | 56—295 |
| 2,936,564 | 5/1960 | Berry | 56—295 |
| 3,003,298 | 10/1961 | Winninger | 56—295 X |
| 3,104,510 | 9/1963 | Voigt | 56—295 |
| 3,133,398 | 5/1964 | Tatum | 56—295 X |

ABRAHAM G. STONE, *Primary Examiner.*

ANTONIO F. GUIDA, *Examiner.*